(12) United States Patent
Glynn et al.

(10) Patent No.: US 10,817,611 B1
(45) Date of Patent: Oct. 27, 2020

(54) FINDINGS REMEDIATION MANAGEMENT FRAMEWORK SYSTEM AND METHOD

(71) Applicant: Capital One Services, LLC, McLean, VA (US)

(72) Inventors: Anthony Glynn, Washington, DC (US); Vu Nguyen, Pittsburg, CA (US); Matthew Parr, Leesburg, VA (US); Peter Taffs, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/718,614

(22) Filed: Dec. 18, 2019

(51) Int. Cl.
*G06F 12/14* (2006.01)
*G06F 21/57* (2013.01)

(52) U.S. Cl.
CPC ...... *G06F 21/577* (2013.01); *G06F 2221/033* (2013.01)

(58) Field of Classification Search
CPC ............ G06F 21/566; G06F 2221/033; G06F 21/6245; G06F 2221/2141; G06F 21/577; H04L 63/20; H04L 63/1425; H04L 67/16
See application file for complete search history.

(56) References Cited

U.S. PATENT DOCUMENTS

| | | | |
|---|---|---|---|
| 7,870,387 B1 | 1/2011 | Bhargava et al. | |
| 8,918,867 B1* | 12/2014 | Salour | H04L 63/1425 726/22 |
| 10,305,929 B2 | 5/2019 | Kulkarni et al. | |
| 2006/0191007 A1* | 8/2006 | Thielamay | G06F 21/577 726/22 |
| 2010/0198636 A1* | 8/2010 | Choudhary | G06F 21/552 705/7.28 |
| 2010/0281543 A1* | 11/2010 | Golomb | G06F 21/577 726/25 |
| 2012/0030083 A1* | 2/2012 | Newman | G06Q 40/00 705/35 |

(Continued)

FOREIGN PATENT DOCUMENTS

| | | |
|---|---|---|
| CN | 101156156 A | 4/2008 |
| CN | 101594248 A | 12/2009 |

(Continued)

*Primary Examiner* — Farid Homayounmehr
*Assistant Examiner* — Lizbeth Torres-Diaz
(74) *Attorney, Agent, or Firm* — Banner & Witcoff, Ltd.

(57) ABSTRACT

Aspects described herein may allow for the receiving, from a detection service, a plurality of configuration parameters, wherein each configuration parameter includes a type of a risk and an associated level of the risk, with a corresponding automated remediation action for each configuration parameter. A remediation management framework authenticates the detection service for access to the remediation management framework and initiates a scanning of a system of interest, based on the plurality of configuration parameters, by the detection service, to identify one or more risk findings. The remediation management framework receives the identified one more risk findings; and matches each of the one or more risk findings with the plurality of configuration parameters, which then triggers by the remediation management framework, the corresponding automated remediation action associated with each of the one or more risk findings.

20 Claims, 5 Drawing Sheets

(56) References Cited

U.S. PATENT DOCUMENTS

| | | | |
|---|---|---|---|
| 2013/0055341 A1* | 2/2013 | Cooper | G06F 21/6281 |
| | | | 726/1 |
| 2013/0227683 A1 | 8/2013 | Bettini et al. | |
| 2014/0040979 A1* | 2/2014 | Barton | G06F 21/604 |
| | | | 726/1 |
| 2015/0220730 A1 | 8/2015 | Chen | |
| 2016/0063424 A1* | 3/2016 | Zeng | G06Q 10/0635 |
| | | | 705/7.28 |
| 2017/0272472 A1* | 9/2017 | Adhar | H04L 63/20 |
| 2018/0027006 A1* | 1/2018 | Zimmermann | H04L 63/0245 |
| | | | 726/11 |
| 2019/0207981 A1* | 7/2019 | Sweeney | H04L 41/0686 |
| 2020/0065728 A1* | 2/2020 | Wilson | G06Q 50/182 |

FOREIGN PATENT DOCUMENTS

| | | |
|---|---|---|
| CN | 102082802 A | 6/2011 |
| CN | 102831043 A | 12/2012 |

* cited by examiner

FINDINGS REMEDIATION MANAGEMENT FRAMEWORK SYSTEM AND METHOD

FIELD OF USE

Aspects of the disclosure provide for systems and methods of improving software integrity and stability. More particularly, aspects of the disclosure are directed to automated software systems remediation.

BACKGROUND

Organizations rely on multiple computer systems for many aspects of their business. Software applications that run on these computer systems may be client-server based, web based, and cloud based and are applicable in all industries, such as manufacturing, finance, human resources, sales and marketing, engineering and science research. However, each of these systems, henceforth called "source systems" or "systems of interest," may have compliance issues where some area of the software application is not fully functional, does not meet operational expectations, or has security issues. Such compliance issues are often discovered through other systems typically referred to as "detection systems." Many organizations primarily rely on the source systems, detections systems and manual action as the primary drivers for identifying and developing remediation actions for such issues, leading to inconsistent analysis and inconsistent remedies. Such differences lead to inconsistent solutions being adopted and high levels of manual effort to maintain and address compliance issues in a timely manner.

BRIEF SUMMARY

Given the foregoing, what is needed is a system and method for the detection and remediation of a source system of interest using predefined options for automated response actions through a remediation management framework.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for performing automated remediation of software systems on a system of interest based on predefined remediations associated with a type of risk and an associated level of the risk.

According to at least one aspect, a computer-implemented method includes receiving, by a detection service, a set of configuration parameters, where each configuration parameter includes a type of a risk and an associated level of risk for each type, with a corresponding automated remediation action for each configuration parameter. The method includes authenticating, by a remediation management framework, the detection service for access to the remediation management framework and the scanning of a system of interest by the detection service, based on the set of configuration parameters, to identify one or more risk findings. The method continues by receiving the identified one or more risk findings and matching each of the one or more risk findings with the set of configuration parameters. The matching then triggers a corresponding automated remediation action associated with each of the one or more risk findings.

In another embodiment, a findings remediation management framework system includes a detection service and a remediation management framework. The detection service may be configured to receive a set of configuration parameters, where each configuration parameter includes a type of a risk and an associated level of risk for each risk type. In addition, each configuration parameter action may be associated with a corresponding automated remediation action. The detection service then scans a system of interest, based on the set of configuration parameters to identify one or more risk findings. The remediation management framework may be configured to provide access authentication to the detection service for access to the remediation management framework. The remediation management framework then receives, from the detection service, the identified one more risk findings and matches each of the identified risk findings with the set of configuration parameters. Once matched, the system triggers a corresponding automated remediation action associated with each of the identified risk findings These features, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media findings remediation management framework system. For example, a software system of interest may contain one or more compliance issues, or an area of software that is not in compliance in terms of system security or functionality, which once detected, needs to be remediated. Such remediation may take many forms such as an email notification, shutting down a server, or further data analysis.

Before discussing these concepts in greater detail, however, several examples of a computing device that may be used in implementing and/or otherwise providing various aspects of the disclosure will first be discussed with respect to FIG. 1.

Figure 1:
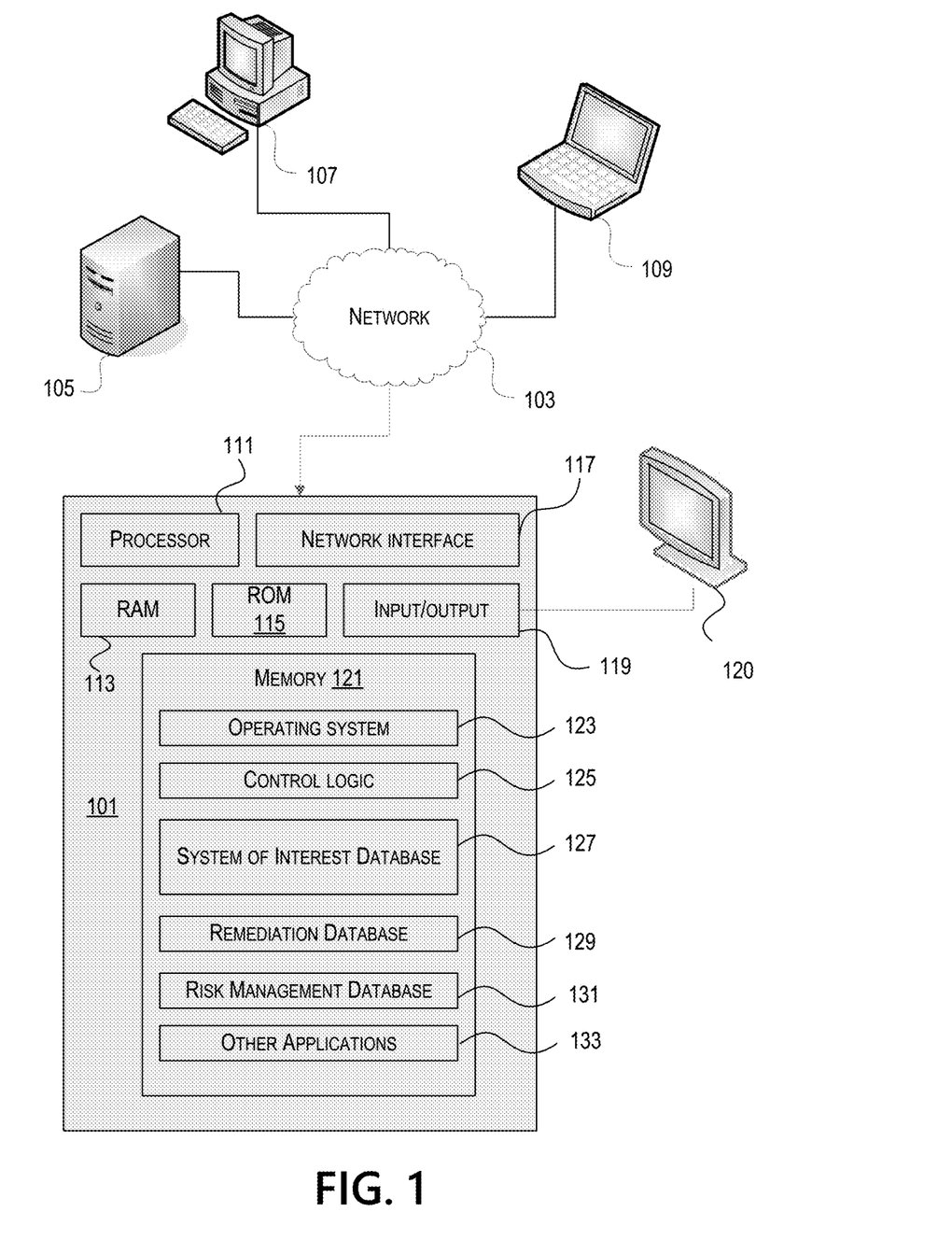
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. While FIG. 1 illustrates the use of a single computing device 101, embodiments discussed within may be based on multiple systems, whether in a standalone environment or a networked environment. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment 100. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database queries, interactions with client applications, scheduling and tracking of scan requests associated with a system of interest, generating remediation actions associated with a completed scan, logging scan results, logging remediation actions and risk levels in a database, and other functions. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use, for example, system of interest database 127, remediation database 129, risk management database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., authentication information, risk management information, and remediation information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or system of interest database 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for a findings remediation management framework system.

Figure 2:
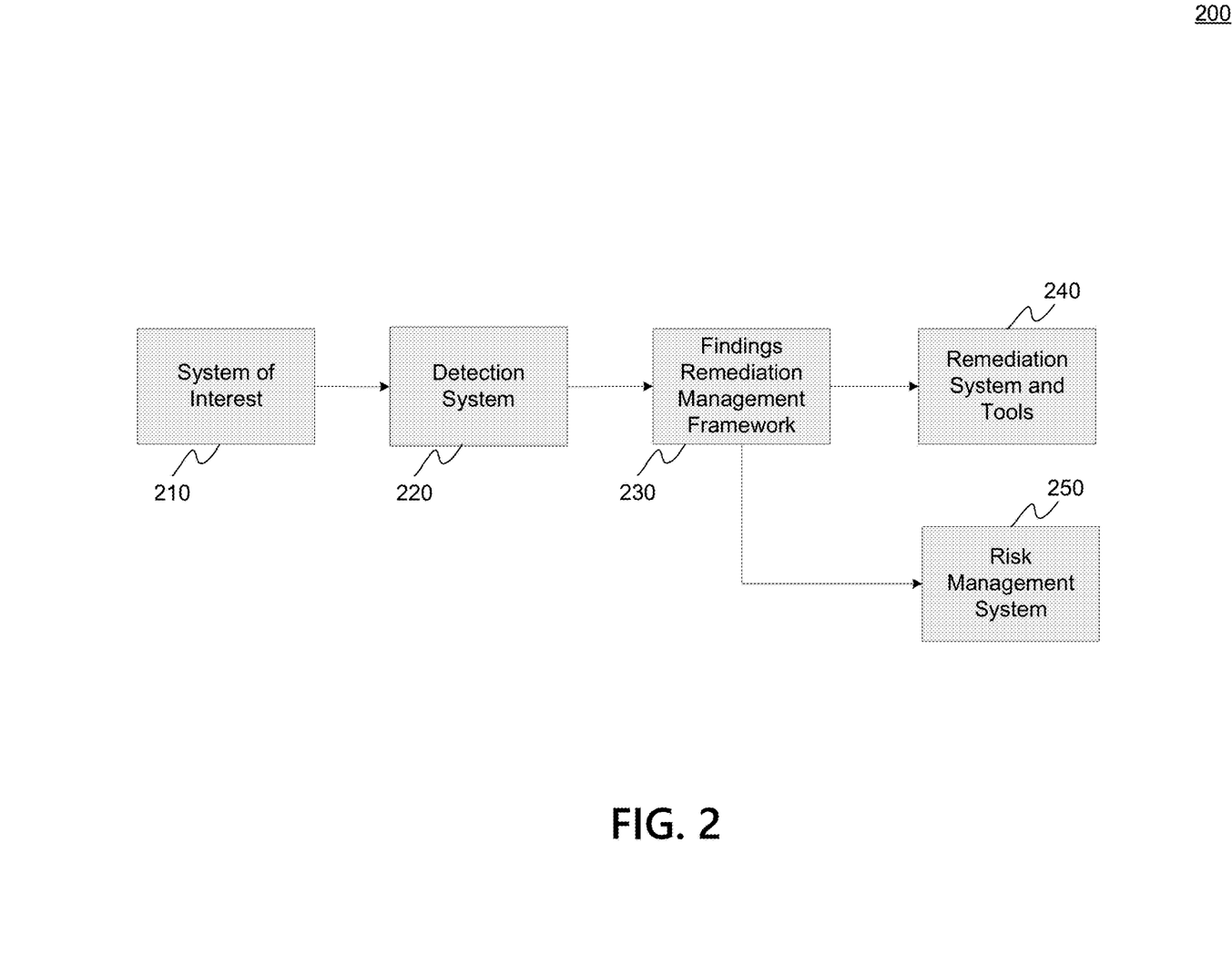
FIG. 2 depicts an overview block diagram of a findings remediation management framework system in accordance with one or more illustrative aspects discussed herein.

FIG. 2 depicts an overview block diagram 200 of a findings remediation management framework system in accordance with one or more illustrative aspects discussed herein. Block diagram 200 includes in at least one aspect, a system of interest 210, a detection system 220, a findings remediation management framework 230, a remediation system and tools 240, and a risk management system 250.

In an embodiment, system of interest 210 may be any type of software application within an organization that runs any type of computing platform, such as computing device 101 or devices 105, 107 or 109. An organization may decide to protect one or more various systems of interest and be able to detect errors in each system. An "error" in the system of interest may take on a variety of forms. The error may be a particular function within the software application that simply does not work, or it may be that a particular function does something different than it was supposed to, for example, a user may complain that the "process that updates the current sales forecast with actual sales figures does not correctly identify the third quarter results." Or, simply that some identified functionality does not meet company expectations. Further, any issues relating to security, access, vulnerability are also "errors" that may be found by scanning the software.

In an embodiment, detection system 220 may be a computer system designed to scan system of interest 210 to identify any error, also referred to as "risk finding" or "finding" as will be used interchangeably herein. Upon determining that there is a finding, detection system 220 sends the identified findings to findings remediation management framework 230. In an embodiment, detection system 220 may be accessible by a user of system of interest 210. In another embodiment, the detection systems may be a third party service or software application that may be located locally, at the user's site, as a cloud based service, or on a mobile device.

Findings remediation management framework 230 receives any findings identified by detection system 220 and acts as an interface with external systems to implement any applicable remediation action as appropriate. For example, findings remediation management framework 230 may be coupled to remediation systems and tools 240, such that after a finding has been detected, findings remediation management framework 230 may determine that the proper remediation is to upload a software patch to correct a misconfiguration in system of interest 210. In that case, findings remediation management framework 230 may instruct remediation systems and tools 240 to execute the desired remediation to system of interest 210. Further, findings remediation management framework 230 may also log the issue and the remediation action taken to risk management system 250.

Figure 3:
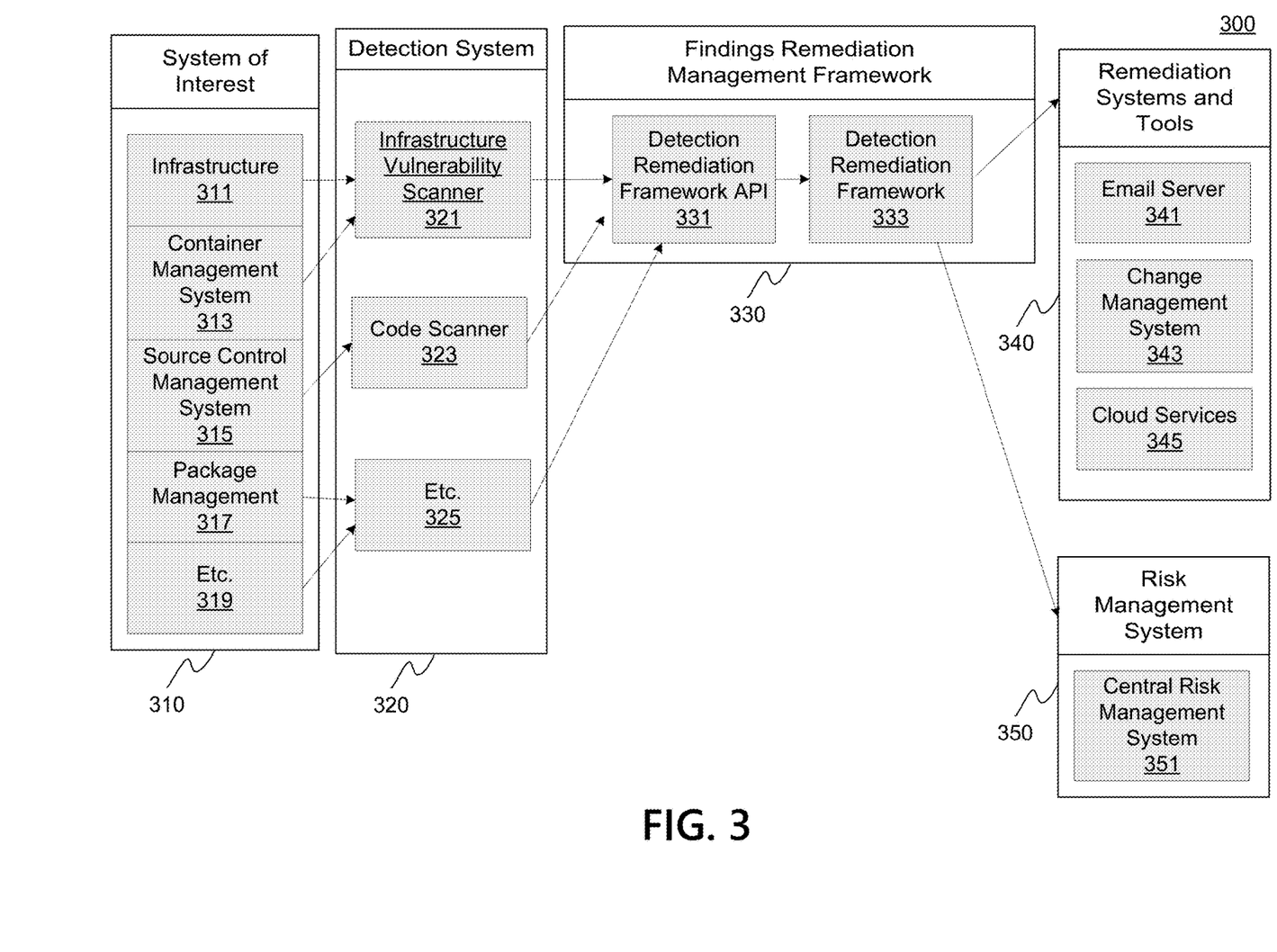
FIG. 3 depicts a detail block diagram of a findings remediation management framework system in accordance with one or more illustrative aspects discussed herein.

FIG. 3 depicts a detail block diagram of a findings remediation management framework system 300 in accordance with one or more illustrative aspects discussed herein. Findings remediation management framework system 300 includes in at least one aspect, a system of interest 310, a detection system 320, a findings remediation management framework 330, a remediation system and tools 340, and a risk management system 350.

In an embodiment, system of interest 310 includes multiple components, which may include an infrastructure 311, a container management system 313, a source control management system 315, a package management 317, and other unspecified controls and contents 319. System of interest 310 may be comprised of a certain structure, in this example infrastructure 311. Infrastructure 311 may be queried by detection system 320. System of interest 310 also may include container management system 313. Container management system 313 includes software that automates the creation, destruction, deployment and scaling of software containers, where containerization is an approach to software development that groups and isolates processes that share an operating system. The bundled software processes may then be deployed as a single deployable unit. Source control management system 315 may be used to track versions and revisions of software modules within system of interest 310. Package management 317, within system of interest 310, may include a collection of software tools that are used to automate the process of installing, upgrading, configuring and removing software application programs for a computer's operating system in a consistent manner. Package management 317 may include various metadata that may include a description of the software, version information and a list of dependencies that are necessary for the software to correctly load and execute and may be used to automate the installation and update process of an application program.

In an embodiment, detection system 320 may also include an infrastructure vulnerability scanner 321, a code scanner 323 and other miscellaneous software and controls 325. Infrastructure vulnerability scanner 321 may include an Approved Scanning Vendor, such as any one or more third-party vendors, to provide asset management, information technology security, compliance, cloud and container security and web application security. Thus, infrastructure vulnerability scanner 321 will scan system of interest 310, including the analysis of its infrastructure and container management system 313 to determine if there are any issue or risks that need to be addressed. In a similar manner, code scanner 323 may scan the source control management system 315 to determine if there were any findings, or areas of incompatibility or compliance that need to be addressed as part of a remediation action.

In an embodiment, findings remediation management framework 330 includes a detection remediation framework application program interface (API) 331 and a detection remediation framework 333. Detection remediation framework API 331 communicates with detection system 320 to receive the results of its scanning of system of interest 310 to identify any risks. Detection remediation framework 333, after receiving the identified risks on system of interest 310, determines the appropriate remediation to be performed on system of interest 310.

In an embodiment, remediation systems and tools 340 includes an email server 341, a change management system 343, and a cloud service 345. Remediation system and tools 340 may be responsible for the implementation of any remediation actions determined by findings remediation management framework 330 that may include notification emails that may be sent by email server 341 or the use of change management system 343 to upload new software or a patch to system of interest 310. Further, if the system of interest 310 exists in a cloud environment, then cloud services 345 may take the necessary actions for remediation of a cloud based system of interest.

In an embodiment, risk management system 350 includes a central risk management system 351. Central risk management system 351 generates and maintains an audit log of all the issued remediation actions. Such an audit trail provides proof of compliance and a history of actions taken for system of interest 310.

Figure 4:
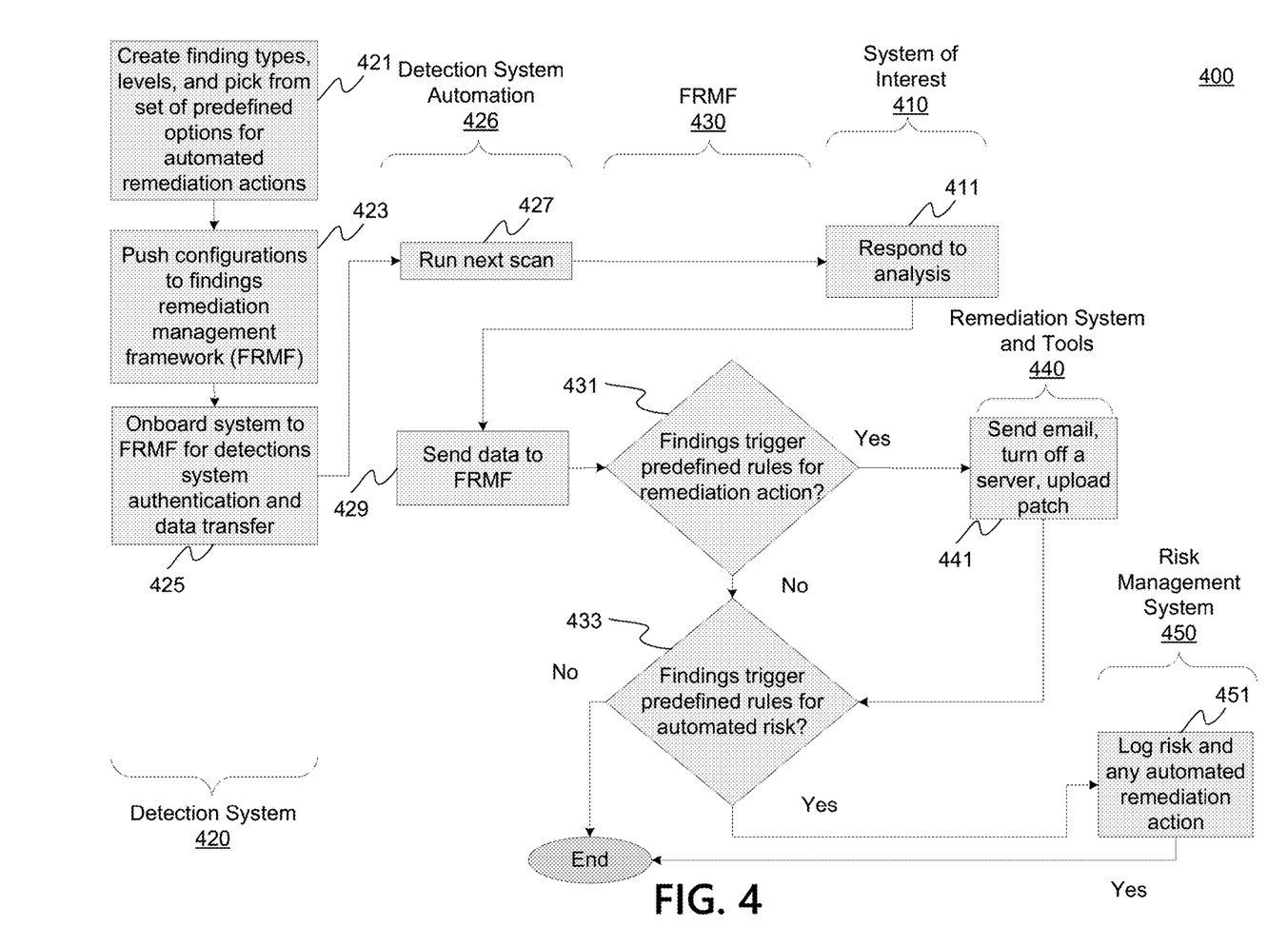
FIG. 4 depicts a flowchart block diagram of a findings remediation management framework system in accordance with one or more illustrative aspects discussed herein.

FIG. 4 depicts a flowchart block diagram of a findings remediation management framework system 400, in accordance with one or more illustrative aspects discussed herein. Findings remediation management framework system 400 details the actions and decisions associated with and includes in at least one aspect, a system of interest 410, a detection system 420, a findings remediation management framework (FRMF) 430, a remediation system and tools 440, and a risk management system 450.

System of interest 410 may exist in a number of environments, including, for example, but not limited to a local server, a remote server, or a cloud based service. Further, the typical approach to remediation of a system of interest is dependent upon the environment in which it exits. Therefore, a remediation solution for a local server system may not necessarily be the same as a remediation solution, for the same application, that exits on a cloud based solution. Therefore, an applications environment may be taken into account in defining remediation. Failure to do so may lead to inconsistent actions and results. In addition, organizations primarily rely on the source system, detection system, and manual actions as the primary source for remediation action across issues, again leading to inconsistent results, even within a single organization.

Findings remediation management framework system 400 addresses the problems of inconsistent application of remediation actions by being the centralized entity between the detection systems and remediation action. An organization may define, for each detection system, a name for the detection system being configured, a set of definitions or algorithms of what types of findings the detection system will generate, and a corresponding remediation action, e.g., emailing a group of point of contacts or blocking future deployments, to take for each type of finding and each level of risk, and what predefined policies that are related to each of the findings being produced. Thus, as findings remediation management framework system 400 receives information from a detection system, it will take a remediation action.

As discussed with findings remediation management framework system 300, system of interest 310 (and system of interest 410) can include an infrastructure 311 and container management system 313, that detection system 320 (and detection system 420) may use to automate the outreach to system of interest 410 to generate the rules and guidelines for detection system 420 to scan and identify risks in system of interest 410.

Prior to being able to run an automatic scan of system of interest 410, detection system 420 may define various dependencies for risk and compliance detection. These dependencies may include an infrastructure vulnerability scanning, a configuration compliance monitoring, an application code analysis and cloud computing service compliance data such as encryption. In addition, an asset registry may be generated that links an infrastructure of system of interest 410 that include servers and elastic compute cloud instances, to any approved scanning vendor that includes ownership metadata such as an accountable executive, a functional point of contact, a development owner, and a business owner. Further, in terms of dependencies, risk-based response guidelines may be defined that include mandatory remediation timelines, threshold designations for automated triage and notifications that will guide the notification and response actions.

Further, to maintain consistent scans by detection system 420 across multiple systems of interest that are potentially maintained on various environments, findings remediation management framework 430 may use predefined policies, procedures and other documented guidance that define the business decisions of an organization. Thus, all of the security and risks findings identified by detection system 420 that are sent to findings remediation management framework 430 may be tied to a "policy," that refers to any policies, procedures, or other organizational documented guidance. In an embodiment, teams formed to manage detection systems create such detection system guidelines to identify risks and problems based on such policies. Further, as findings remediation management framework 430 may be providing organized information to potentially multiple detection systems, there may not be a need for each detection system to create their own rules and policies for scanning systems of interest, thereby providing consistency across multiple systems of interest in various environments using multiple technologies.

Given that policies are defined, at FIG. 4, detection system 420 at 421, creates finding types that may be classified at different levels of severity or risk. Further, predefined options are generated for each finding type, and level of finding type, for an automated remediation action. Once the finding types and associated remediation actions are defined, detection system 420 pushes those configurations at 423 to findings remediation management framework 430. Further, at 425, detection system 420 onboards any necessary systems for findings remediation management framework 430 to authenticate and provide for data transfers from a detection system, such as detection system 420.

Next, detection system 420, using an automated detection scan, e.g., detection system automation 426, runs scan 427 of system of interest 410. Once the scan is completed, system of interest 410 responds to the analysis at 411 and sends the findings results back to detection system 420 at 429 at which point detection system automation 426 directs the findings data to findings remediation management framework 430 in 431. Findings remediation management framework 430 then analyzes the findings identified by detection system 420 in 431 based on the predefined rules based on the policies that were pushed to findings remediation management framework 430 by detection system 420. Findings remediation management framework 430 then determines if any of the findings trigger a remediation action based on the policies. If any of the findings do trigger a remediation action, then remediation system and tools 440 at 411 generate a corresponding remediation action. The remediation action may be defined by the predetermined policies and may include a variety of actions, for example, sending an email with the desired actions to be performed, or turn off a server, or upload a patch, or any type of immediate or delayed action for a predetermined period of time.

If any of the findings do not trigger a remediation action, then findings remediation management framework 430 at 433 analyzes the findings to determine if that finding triggers any of the predefined rules relating to risk. For example, there may be no remediation action associated with the finding at this point in time, but the finding does indicate a growing risk that needs to be addressed in the future. In this situation, risk management system 450 at 451 logs the risk. In a similar manner, if findings remediation management framework 430 at 431 determined that the finding required a remediation action at 441, findings remediation management framework 430 at 433 may also determine if that finding with the remediation action triggers any of the predefined rules relating to risk. For example, even though a remediation action was taken, there may need to be follow on analysis or monitoring according to the predefined policies that may trigger a predefined rule for automated risk to log that risk and the remediation action that was taken at 451.

However, if findings remediation management framework 430 at 433 determines that the finding does not trigger any of the predefined rules for automated risk, the process may end.

In an embodiment, findings remediation management framework 430 provides an application program interface, e.g., RESTful API, that allows for an automated exchange of data with other outside source systems, including other systems of interest and remediation systems. Findings remediation management framework 430 also provides an authentication mechanism for verification of the identity of those systems. In addition, individual users may log into findings remediation management framework 430 via a user authentication and access management system and graphical user interface for maintenance and update of policy definitions. Findings remediation management framework 430 may also be configured to include a database for the storage of a variety of data to include, for example, detection system information, risk information, remediation and risk system information.

Figure 5:
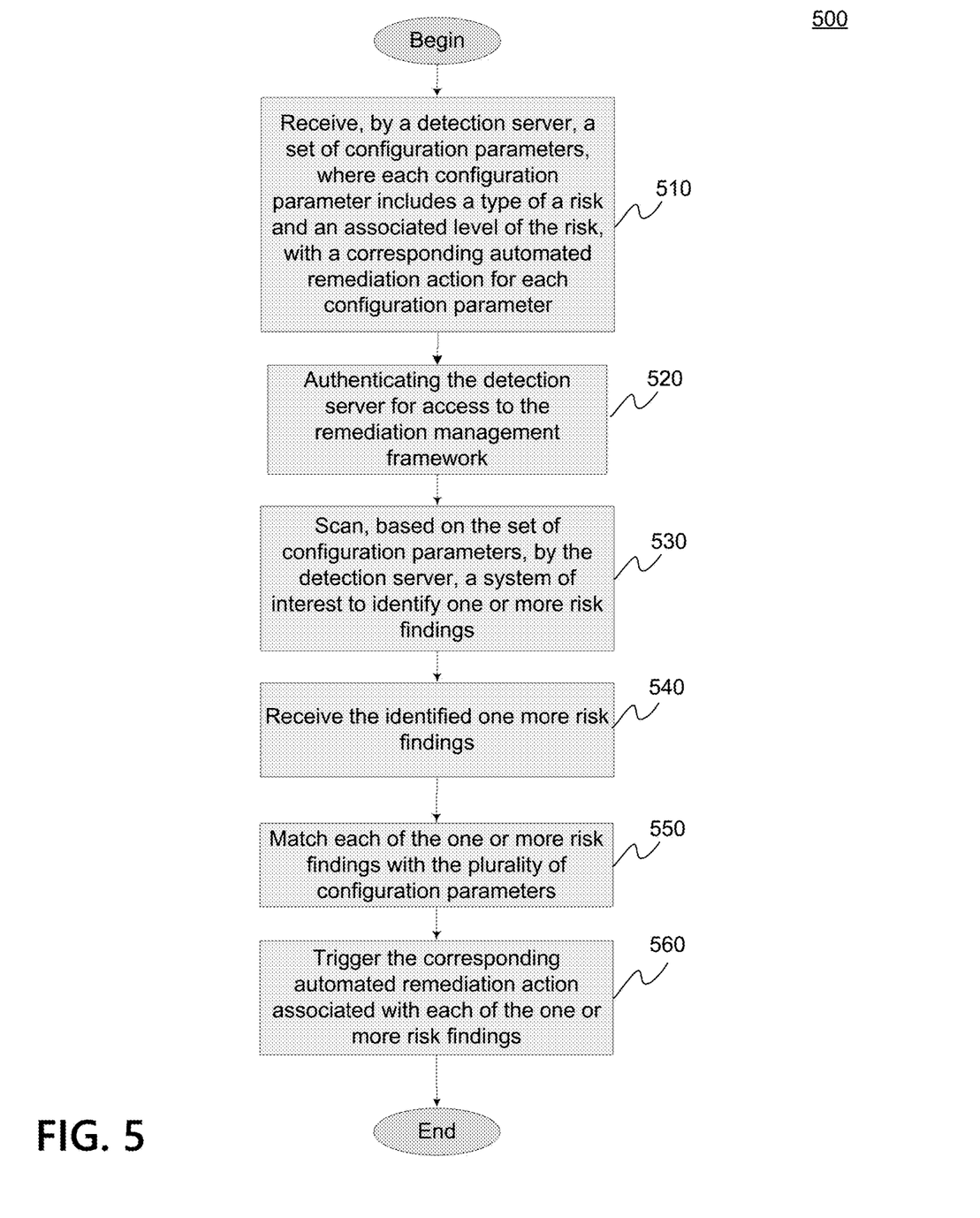
FIG. 5 depicts a flow diagram of a findings remediation management framework system in accordance with one or more illustrative aspects discussed herein.

FIG. 5 depicts a flow chart of an example method 500 for a findings remediation management framework system, according to one or more aspects of the disclosure. In step 510, a detection service receives a set of configuration parameters. The detection service may run on a server, a processor, or any type of computing device, e.g., a Python lambda function. Each of the configuration parameters in the set of configuration parameters defines a type of the risk, i.e., a type of the finding, that may exist in a system of interest, such as system of interest 410. Each configuration parameters includes a type of risk. For example, a risk may pertain to a security issue, or an authentication issue, a performance issue, or a program error. The type of risk may also be associated with a particular architecture, such as if the system of interest is operable on a local area network, a wide area network or cloud based. The type of risk may also be based on a technology, for example where the system of interest operates on an array processor. Or, the type of risk may be based on the language of the system of interest, SQL versus Java versus Fortran, and the like.

Further, each type of risk may also be classified with a level of risk, e.g., low, moderate or high. The level of risk being used as an indicator as to the severity of that risk and timeliness in terms of when it should be addressed, for example, address the issue in the next general release of the program, or shut down the server and implement a remediation immediately. In addition to defining the type of finding and an associated level of risk, the configuration parameters also define the remediation action associated with the finding and level of risk. The remediation action may range from that of monitor the situation and do nothing, emailing one or more people of the occurrence, shutting down a server, or uploading a patch. The set of configuration parameters may be as voluminous as the organization desires and may be tailored to each organization's specific requirements. Further, the set of configuration parameters also defines the remediation action to be associated with each finding. The remediation action may be associated with both the type of finding and a level of risk and will vary as appropriate. The remediation action may be as simple as, for example, do nothing, revisit the situation in a month, notify a list of contacts via email (or other notification platform), and/or upload a software patch. There are no limits as to the degree or type of remediation action associated with a finding. In addition, the set of configuration parameters may also contain predefined rules for automated risk. As previously discussed, an identified finding may trigger a predefined rule for remediation action, but that same finding may also trigger a predefined rule for automated risk where if the finding exceeds a predefined risk threshold then the finding and its associated risk are logged in a risk management system.

Method 500 continues at 520 wherein the findings remediation management framework provides a mechanism for the authentication of one or more detection services. The authentication identifies the detection service and also provides for an application program interface connection between a detection service and the findings remediation management framework for the transfer of data, including the predefined rules discussed in step 510.

At step 530 the detection service performs a scan of a system of interest, for example system of interest 210, 310 and 410. The scan may be done using the predefined rules defined in step 510 to identify any finding. The finding may be also associated with a particular level of risk. A scan may produce no findings, but may also produce multiple findings.

At step 540 the scan of the system of interest may be completed and the resulting identified findings are sent from the detection service to the findings remediation management framework for further processing. At step 550 each of the identified findings, also known as risk findings, has an associated predefined configuration parameter from the set of configuration parameters defined in step 510. And, at step 560, the identified risk finding with its associated configuration parameter dictates the required remediation action. Thus, in step 560, corresponding automated remediation action associated with the identified risk finding may be triggered. There may be one or multiple identified risk findings and thus there may be one or multiple corresponding automated remediation action. The method then ends.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, from a detection service, a plurality of configuration parameters, wherein each configuration parameter comprises a type of a risk and an associated level of the risk, with a corresponding automated remediation action for each configuration parameter;
   authenticating, by a remediation management framework, the detection service for access to the remediation management framework;
   scanning, based on the plurality of configuration parameters, by the detection service, a system of interest to identify one or more risk findings;
   receiving, by the remediation management framework, the identified one or more risk findings;
   matching, by the remediation management framework, each of the identified one or more risk findings with the plurality of configuration parameters;
   triggering, by the remediation management framework, the corresponding automated remediation action associated with each of the identified one or more risk findings; and
   sending, to a central risk management system, log parameters comprising a name of a detection system executed by the detection service, a type of the identified one or more risk findings, the corresponding automated remediation action associated with each of the identified one or more risk findings, and any applicable policy, wherein the central risk management system generates and maintains an audit trail based on the log parameters.

2. The computer-implemented method of claim 1, further comprising authenticating a user for access to the remediation management framework for performing maintenance of the plurality of configuration parameters.

3. The computer-implemented method of claim 1, wherein the remediation management framework is configured to provide an application program interface to an outside source system for an identity authentication prior to the outside source system sending data to the remediation management framework.

4. The computer-implemented method of claim 1, further comprising storing data comprising detection service information, risk information, remediation and risk system information.

5. The computer-implemented method of claim 1, wherein the type of the risk for each of the plurality of configuration parameters is based on an architecture, a technology, or a language.

6. The computer-implemented method of claim 1, wherein the corresponding automated remediation action associated with a risk finding is controlled by a policy.

7. The computer-implemented method of claim 6, wherein the policy comprises pre-defined procedures or documented guidance.

8. The computer-implemented method of claim 1, wherein the corresponding automated remediation action associated with a risk finding comprises a notification, an immediate action, or a delayed action.

9. A findings remediation management framework system comprising:
   a server comprising a first memory and a first processor, the first memory storing first instructions that when executed by the first processor cause the server to:
      receive a plurality of configuration parameters from a detection service, wherein each configuration parameter comprises a type of a risk and an associated level of the risk, and wherein each configuration parameter is associated with a corresponding automated remediation action; and
      scan a system of interest, based on the plurality of configuration parameters, to identify one or more risk findings;
   a remediation management framework comprising a second memory and a second processor, the second memory storing second instructions that when executed by the second processor cause the remediation management framework to:
      provide access authentication to the detection service for access to the remediation management framework;
      receive, from the detection service, the identified one or more risk findings; and
      match each of the identified one or more risk findings with the plurality of configuration parameters to trigger, by the remediation management framework, the corresponding automated remediation action associated with each of the identified one or more risk findings; and
   a central management risk system comprising a third memory and a third processor, the third memory storing third instructions that when executed by the third processor cause the central management risk system to:
      receive, from the remediation management framework, log parameters comprising a name of a detection system executed by the detection service, a type of the identified one or more risk findings, the corresponding automated remediation action associated with each of the identified one or more risk findings, and any applicable policy, to generate and maintain an audit trail based on the log parameters.

10. The system of claim 9, wherein the second instructions, when executed by the second processor, further cause the remediation management framework to authenticate a user for access to the remediation management framework for performing maintenance of the plurality of configuration parameters.

11. The system of claim 9, wherein the system of interest is configured to authenticate the detection service.

12. The system of claim 9, wherein the system of interest provides an application program interface to a plurality of detection systems executed by the detection service.

13. The system of claim 9, wherein the corresponding automated remediation action associated with a risk finding comprises a generation of an email or a shut down of a server.

14. The system of claim 9, wherein the associated level of the risk comprises a low, a moderate, or a high level of risk.

15. The system of claim 9, wherein the corresponding automated remediation action associated with a risk finding is controlled by a policy.

16. The system of claim 15, wherein the policy comprises pre-defined procedures or documented guidance.

17. The system of claim 9, wherein the corresponding automated remediation action associated with a risk finding comprises a notification, an immediate action, or a delayed action.

18. A non-transitory computer readable medium storing instructions that, when executed by one or more processors, cause a remediation management framework to perform steps comprising:
- receiving, from a detection service, a plurality of pre-defined configuration parameters, wherein each pre-defined configuration parameter comprises a type of a risk and an associated level of the risk, with a corresponding automated remediation action for each configuration parameter;
- scanning, based on the plurality of pre-defined configuration parameters, by the detection service, a system of interest to identify one or more risk findings;
- receiving the identified one or more risk findings in the system of interest;
- matching each of the identified one or more risk findings with the plurality of pre-defined configuration parameters;
- triggering the corresponding automated remediation action associated with each of the identified one or more risk findings; and
- sending, to a central risk management system, log parameters comprising a name of a detection system executed by the detection service, a type of the identified one or more risk findings, the corresponding automated remediation action associated with each of the identified one or more risk findings, and any applicable policy, wherein the central risk management system generates and maintains an audit trail based on the log parameters.

19. The non-transitory computer readable medium of claim 18, wherein the instructions, when executed by the one or more processors, further cause the remediation management framework to perform steps comprising:
- authenticating the detection service for access to the remediation management framework.

20. The non-transitory computer readable medium of claim 18, wherein the instructions, when executed by the one or more processors, further cause the remediation management framework to perform steps comprising:
- authenticating a user for access to the remediation management framework for performing maintenance of the plurality of pre-defined configuration parameters.

* * * * *